United States Patent [19]

Richards et al.

[11] 4,243,300
[45] Jan. 6, 1981

[54] LARGE APERTURE PHASED ELEMENT MODULATOR/ANTENNA

[75] Inventors: William E. Richards, Silver Springs, Md.; Henry F. Taylor, Newbury Park, Calif.

[73] Assignee: The United States of America as represented by the Secretary of the Navy, Washington, D.C.

[21] Appl. No.: 970,828

[22] Filed: Dec. 19, 1978

[51] Int. Cl.$^3$ ................................................ G02F 1/03
[52] U.S. Cl. ..................................... 350/150; 350/355
[58] Field of Search ............... 350/150, 353, 355, 356, 350/96.14

[56] References Cited

U.S. PATENT DOCUMENTS

| | | | |
|---|---|---|---|
| 3,787,111 | 1/1974 | Giordmaine et al. | 350/356 |
| 3,923,380 | 12/1975 | Hattori et al. | 350/356 |
| 3,930,718 | 1/1976 | Jensen | 350/356 |
| 3,958,862 | 5/1976 | Scibor-Rylski | 350/356 |
| 4,115,747 | 9/1978 | Sato et al. | 350/355 |

Primary Examiner—Richard A. Rosenberg
Attorney, Agent, or Firm—Richard S. Sciascia; Ervin F. Johnston; Thomas G. Keough

[57] ABSTRACT

An electro-optical modulator/antenna operates in the tunable diffraction grating mode to vary the magnitude of the zero diffraction order and consequently transmits optical information. A relatively thin slab of lithium niobate or equivalent electro-optic material has its lateral surfaces optically polished and its C-axis, or optical axis, running parallel to the polished lateral surfaces. At least one set of interdigital metallic electrodes are deposited on the face or just within the lateral surfaces to form, among other things, a diffraction grating that is orthogonally disposed with respect to the C-axis. When a potential source is coupled to the interdigital electrodes, the electric fields between adjacent electrodes change the crystal's index of refraction in accordance with the linear transverse Pockel's effect. The thin crystal having the electrodes substantially covering at least one of its lateral surfaces, thusly presents a large aperture modulator/antenna capable of modulating incident optical energy over a wide angle of incidence, for example, up to plus and minus 45 degrees. Because of the thinness of the crystal, transmissivity is good and losses are reduced. The cooperation between the diffraction grating phenomenon and the Pockel's effect greatly reduces if not totally eliminates the possibility of arcing between adjacent electrodes as the zero diffraction order is modulated since the potentials creating the modulating electric fields between adjacent interdigital electrodes are greatly reduced in this mode of operation.

8 Claims, 14 Drawing Figures

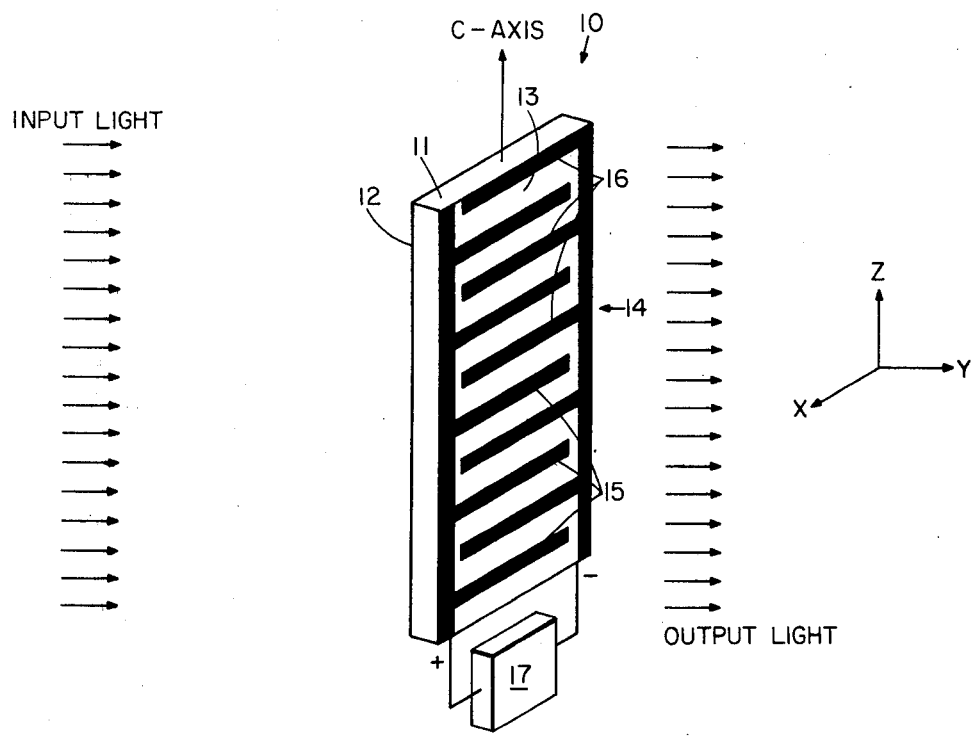
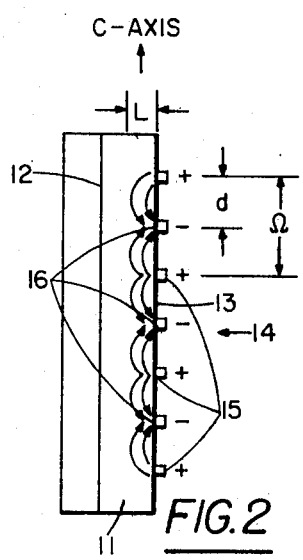
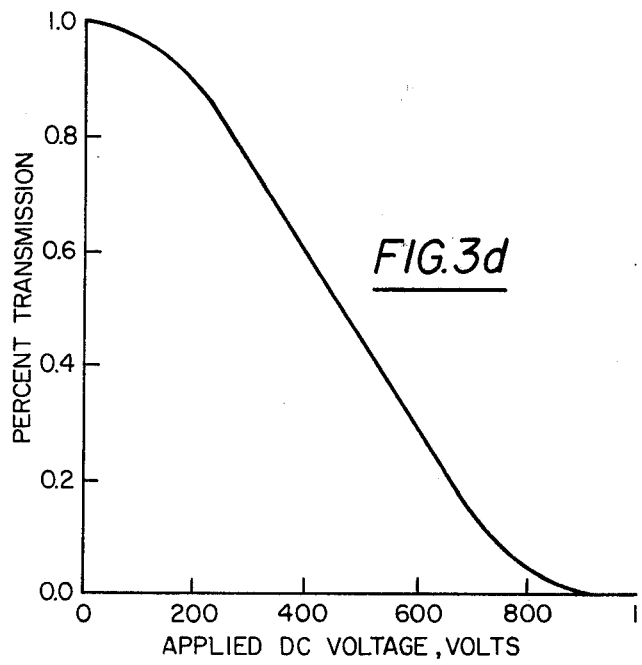
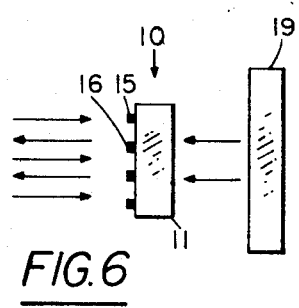

LARGE APERTURE PHASED ELEMENT MODULATOR/ANTENNA

BACKGROUND OF THE INVENTION

A wide variety of optical modulators have been developed in a continuing evolution. A number of active optical materials, for example, magneto-optical, electro-optical, ferroelectric, semiconductor, etc. are used with varying degrees of success. However, all compromise some aspects of their performance when modulation of large aperture, wide angle incidence signals is attempted. The magneto-optic modulators, generally speaking, tend to be operated only in a pulsed mode, they are expensive and have been found to require highly sophisticated driving electronics. Ferroelectric materials, even when interdigital electrodes apply the electric field, require a pair of polarizers that necessitate higher operating voltages and the consequent possibility of arcing between adjacent electrodes. Semiconductor and acousto-optical materials inherently possess limitations regarding their operational spectrums, usually the infrared spectrum with a material such as GaAs and Ge, and generally speaking, acousto-optic materials require high driving input levels which have a tendency to destroy or crack their substrate materials.

The conventional electro-optical modulators have not addressed themselves to maintaining beam divergence qualities of 10 to 100 microradians nor did they attempt to modulate large angles of incident energy up to plus and minus 45 degrees. Many of the old techniques primarily used large length-to-diameter ratios (long and thin crystals) and an electro-optic effect for modulation. An obvious shortcoming of this approach was the creation of a small acceptance angle and a fragile structure with a small cross section that produced relatively large effects on beam divergence greater than one milliradian Another disadvantage of the long narrow crystals was that they were lossy and not capable of transmitting high optical powers.

Balancing the constraints of large aperture, large acceptance angles of incidence, reduced power requirements and low cost of materials has tended to steer designers toward an electro-optical material such as a crystal of lithium niobate ($LiNbO_3$) or lithium tantalate ($LiTaO_3$) for visible radiation or gallium arsenide (GaAs) or cadmium telluride (CdTe) for infrared radiation.

An article dated July 19, 1973 and entitled "Low Voltage Optical Modulator Using Electro-Optically Induced Phase Gratings" by Toshio Motoki appeared in Volume 12, number 7 of Applied Optics. An electro-optic array modulator was fabricated from a number of $LiNbO_3$ rods. The number of rods had to be precisely shaped and secured together in an alternating axis pattern so that a relatively low modulation potential could diffract impinging light passing through its longitudinal axes into many orders. A typical diffraction angle-far field pattern was produced; yet the long-rod modulator is limited in its acceptance angle of light and the cost and complexity of making a large aperture design appears to be prohibitive. In addition, this design might suffer a loss of transmissivity since the incident light waves must travel the length of the sandwiched rods and beam divergence could be excessive.

R. A. Meyer developed a multichannel phase modulator employing a crystal of lithium tantalate to perform one dimensional optical beam steering. His results are discussed at length in an article appearing in the Mar. 19, 1972 edition of Applied Optics, Volume 11, number 3 and entitled "Optical Beam Steering Using a Multichannel Lithium Tantalate Crystal". This modulator beam steers to 46 channels of light which traverses through a thick dimension extending along the $X_2$ axis and along which are placed a number of parallel electrodes for altering the birefringence of the crystal. Masks aligned with the electrodes block a considerable portion of the light so that when considered with the crystal's thickness, transmissivity and acceptance angle are compromised.

A $LiNbO_3$ electro-optic modulator was disclosed in the 20th of May, 1971 issue of Electronics Letters, volume 7, number 10. A beam compression lens directs a z polarized laser beam along the longitudinal y optic axis and a modulating voltage is fed to an interdigital electrode arrangement parallel to the y-z plane to effect a Pockel's -type linear modulation. Modulatable diffraction orders were observed with improved performance when a d.c. bias was added to the modulating voltage; however, wide aperture and acceptance angle in addition to a possible loss of transmissivity through the longitudinal y-axis may reduce the effectiveness of this design.

J. M. Hammer in his article entitled "Digital Electro-Optic Grating Deflector and Modulator" appearing in Applied Physics Letters, Volume 18, number 4 of February 1971 diffracted focussed light by electro-optic phase gratings. This technique was found to be particularly adaptable to thin-film light guides which require relatively low power for high speed operation. Differently dimensioned electrode columns were mounted on one side of a lithium niobate wafer and a ground was uniformly deposited on the other side to vary a periodic electric field that changed the refractive index. Light was diffracted into several orders along the Y direction. The angle of incidence and acceptance angle appear to be small since the differently dimensioned columns would change the diffracted orders as the angle of incidence was changed. Also, because light was transmitted through one of the larger dimensions of the crystal, losses may be unacceptable for lower energy signals. Furthermore, because of the differently dimensioned electrode columns, it might be quite expensive to fabricate.

One other approach that bears mention at this point is the electro-optical modulator disclosed in U.S. Pat. No. 3,958,862 issued to Marek Tadeusz Victor Scibor-Rylski on May 25, 1976. Incident light is transmitted in the general direction of the length of a lithium niobate crystal to come in close proximity or impinge upon a number of longitudinally disposed interdigital electrodes. The total internally reflected light is diffracted into different orders. Here again it appears that this modulator would not have an overly large aperture and would not lend itself to the reception, modulation, and transmission of light outside of a relatively narrow acceptance angle. The modulator also would tend to attenuate a light beam by transmitting the beam through an excessive amount of the electro-optical material.

Thus, there is a continuing need in the state-of-the-art for a wide acceptance angle-large apertured modulator of collimated optical signals operable in the tunable diffraction grating mode which is relatively inexpensive and capable of highly reliable operation.

SUMMARY OF THE INVENTION

The present invention is directed to providing a large apertured apparatus for modulating impinging collimated optical signals in the tunable diffraction grating mode. An electro-optical crystal slab has parallel, optically polished lateral faces whose dimensions are greatly in excess of the crystal's thickness and is fabricated from a material to orient its optic or C-axis parallel to the lateral faces. A first set of interdigital metallic electrodes is orthogonally disposed with respect to the optic axis on one of these faces to extend in an interdigital grating pattern. The dimensions of the electrodes and the spacing between adjacent electrodes create a diffraction grating. A source of potential is coupled to the interdigital electrodes to drive alternating electrodes plus and minus to produce changing electric fields in alternating directions. These electric fields are substantially parallel to the optic axis and when changed in magnitude linearly effect a change in the index of refraction in the crystal. The crystal and the electrodes are oriented to receive, modulate and transmit optical signals impinging from within a wide angle of incidence centered about the normal to the lateral faces of the crystal. By fashioning the crystal from, for example, lithium niobate or lithium tantalate of acoustic grade or better grade quality and depositing the metallic electrodes on the crystal by low cost integrated circuit techniques, cost is greatly lowered. When used with a mirror or retroreflector, incident light over a wide angle and arriving through a large aperture is capable of being passively modulated.

Therefore, it is a prime object of the invention to provide an improved electro-optic modulator and antenna.

Yet another object is to provide an electro-optical modulator-antenna having a large aperture.

Still another object is to provide a modulator/antenna capable of modulating incident beams over a large angle approaching ±45 degrees.

Still another object is to provide an electro-optical modulator-antenna capable of maintaining incident beam divergence qualities of within 10 to 100 microradians.

Yet another object is to provide a modulator capable of receiving, modulating, and transmitting high powered optical signals.

Still another object is to provide an electro-optic modulator employing a relatively thin slab of an electro-optic material receiving impinging light about the normal so as not to overly introduce losses nor excessively contribute to beam divergence.

Still another object of the invention is to provide an electro-optical modulator upon which the electro-optical material has an interdigital grating deposited for electro-optically cooperating in a tunable diffraction grating mode.

Still another object is to provide a modulator/antenna having at least one set of interdigital electrodes deposited on an electro-optic material for impressing a transverse electric field across the crystal to alter the crystal's index of refraction.

Yet another object is to provide an electro-optical modulator/antenna in which interdigital electrodes are orthogonally disposed with respect to the crystal's C-axis to allow more significant changes of the crystal's index of refraction at reduced potential levels.

Still another object is to provide an improved electro-optical modulator/antenna in which interdigital electrodes for impressing an electric field are selectively dimensionable to define given orders of diffraction for a frequency of interest.

Still another object of the invention is to provide an improved modulator/antenna in which two sets of interdigital electrodes are deposited on opposite sides of a slab-shaped electro-optical crystal to make the electric field lines more uniform thereacross to change the indices of refraction.

Yet another object is to provide a large aperture, large incident angle modulator/antenna capable of allowing high-speed beam steering of high-powered optical beams.

These and other objects of the invention will become more readily apparent from the ensuing specification when taken with the drawings.

BRIEF DESCRIPTION OF THE DRAWINGS

FIG. 1 is an isometric depiction of the basic elements of an embodiment of the invention with the relative dimensions greatly exaggerated.

FIG. 2 shows a cross-sectional view taken generally along lines 2—2 in FIG. 1.

FIGS. 3a, 3b, 3c and 3d depict the effect of applied voltage on the far-field energy distribution of the various diffraction orders and the transmission characteristics of the crystal in the diffraction grating mode for the zeroth order as a function of the applied d.c. voltage.

FIG. 6 is another modification employing a mirror.

DESCRIPTION OF THE PREFERRED EMBODIMENTS

Figure 3A:
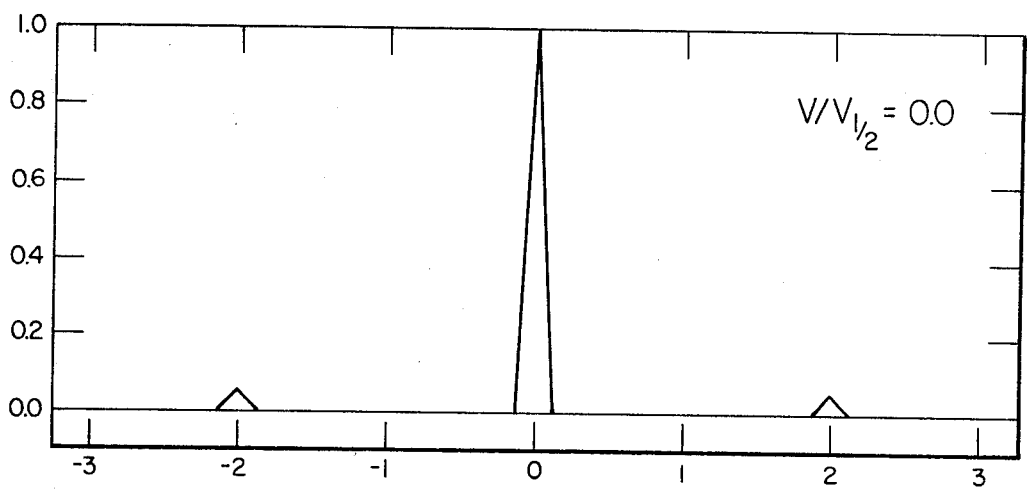

Referring now to FIG. 1 of the drawings, a representative embodiment of an electro-optical modular/antenna 10 receives collimated input light and modulates it by redistributing light from the zeroth diffraction order to order higher orders. Modulation is effected by varying the modulator/antenna's refractive index in accordance with the linear Pockel's effect.

An electro-optic slab 11 is fashioned from an acoustic grade lithium niobate, LiNbo₃, or lanthium niobate, LaNbO₃ crystal. This relatively low cost LiNbO₃ slab was of the type commercially marketed by the Union Carbide Corporation, Crystal Products Department of San Diego, Calif. Its designation as being acoustic grade indicates that it was a relatively fast grown crystal as opposed to a slow grown optical grade. The difference in growth rates, along with several other parameters, tends to create optical strains which might slightly distort the transmission of an optical signal. Typically, acoustic grade LiNbO₃ is quite acceptable in traveling surface wave modulators and it has been found to be a suitable material for a tunable diffraction grating modulator in this invention.

The crystal is cut into a slab measuring 55 mm ($\approx 2.1$ inches) by 45 mm ($\approx 1.8$ inches) and having a thickness of 3 mm ($\approx 0.12$ inches). The C-axis is oriented along the 55 mm dimension, and both of the large 55 mm and 45 mm faces 12 and 13 of the crystal are polished to an optical flatness of less than one wavelength of light of a frequency of interest. Thus, the $LiNbO_3$ crystal has a clear aperture measuring approximately 45 by 55 millimeters. The relatively clear crystal being only about 3 millimeters thick did not overly affect the transmissivity nor did it vary the modulator's response to light in an acceptance angle within an arc extending over approximately plus and minus 45 degrees to the normal of the polished faces.

An interdigital metallic electrode 14 is uniformly deposited across at least one of the polished faces of the crystal slab. Two sets of distinct electrodes 15 and 16 make up the interdigital metallic electrode and are deposited in accordance with proven printed circuit techniques. The relatively inexpensive method of mounting the electrodes on the low cost acoustic grade $LiNbO_3$ slab reduces the per unit cost.

Individual electrodes are about 0.2 $\mu m$ thick and 100 $\mu m$ wide, the center spacing, d, between adjacent electrodes in sets 15 and 16 is 1 mm. Thus, the electrodes cover only about 10% of the crystal's surface, see FIG. 2.

At this point it should be emphasized that the drawings attempt to present the operative interrelationship of the invention in schematic form. The relative dimensions of the $LiNbO_3$ slab, the electrodes and separations between adjacent electrodes are set forth in the preceding text and are to be construed as demonstrative of the inventive concept. Variations from these exact dimensions are within the scope of one skilled in this art and are contemplated without departing from the scope of this inventive concept.

Looking once more to FIG. 2, set 15 and set 16 of interdigital electrodes 14 are deposited on the surface of the electro-optical slab 11 so that electric fields can be impressed between the electrodes and through a portion of the slab. These electric fields change the crystal's index of refraction in accordance with the linear Pockel's effect and affect the crystal's index of refraction to a depth, L. This depth, L, can be small relative to the crystal's thickness and, hence, the magnitude of the electric fields and consequent power requirements can be held within reasonable limits.

Although the modulation of the incident light relies on changing the crystal's index of refraction via the linear Pockel's effect, the transverse electric fields extending between adjacent interdigital electrodes does not cause operation of the modulator in the conventional Pockel's mode. In a conventional Pockel's cell transversely modulated in the Pockel's mode, the electric field changes the cell's birefringence and plane polarized light propagating through the cell is resolved into two orthogonal vectors. The change in retardation between the two vectors is directly proportional to the magnitude of the electric field. A crossed polarizer is required to analyze the output beam resulting in intensity modulation.

In contradistinction in the present invention, no polarizers are necessary. The electro-optical crystal is modulated and operated in the turnable diffraction grating mode. By this mode of modulation incident light is diffracted from the zeroth order into higher orders in response to a changing transverse electric field between the two sets comprising the interdigital electrodes.

Light passing through the crystal undergoes a spatially periodic phase shift which is proportional to the applied voltage for a fixed electrode spacing. The spatial period of the phase shift equals twice the electrodes spacing. The magnitude of the effect is different for the two polarization components, those being perpendicular and parallel to the C-axis. It has been found that this effect is magnified when, as in the present invention, the applied potentials causing the electric fields within a depth L in the crystal, are parallel to the C-axis. For this reason, the interdigital electrodes are disposed in an orthogonal relationship with respect to the C-axis of the crystal so that the modulating electric fields are substantially parallel to the C-axis and substantially perpendicular to the light path.

The linear diffraction grating mode of operation distributes light passing through the crystal into various orders of diffraction. When a mirror or retroreflector used in embodiments to be described below, the distribution can be magnified. The amount of light distributed into each order is a function of the modulator material for a given wavelength, $\lambda$, and the interdigital electrode spacing, d. Since the applied fields vary the index of the refraction in accordance with the linear Pockel's effect, light can be redistributed from the zeroth order to various higher diffraction orders in the far-field energy distribution in a predictable manner by determinable electric fields between the electrodes.

The diffraction grating phenomenon has been long established in the art. A representative article by C. V. Raman and N. S. N. Nath appears in Proc. Ind. Acad. Sci. A 2 (1935) 406, 413; ibid (1936) 75,119. This article, among others, helped give birth to the term Raman-Nath effect to describe this type of modulation and it is well known to those versed in the electro-optic arts. Although the Raman-Nath effect was validated using acoustic techniques, the same general theory applies in an analysis of this invention as it spatially periodically changes the index of refraction by the electro-optic effect across the $LiNbO_3$ crystal. That is to say, the change in diffraction caused by a series a transverse acoustic waves are substantially the same as the change in diffraction attributed to the spatially periodic phase shift which is caused by the alternating electric fields set up between the interdigital electrodes. Hence, the change in diffraction orders with given potentials is predictable.

Operation of this invention in the tunable diffraction grating mode does not require an output polarizer as when a crystal is driven in the conventional Pockel's mode to allow the complete redistribution of light energy from the zeroth order to higher orders at reduced driving potentials.

Figure 3B:
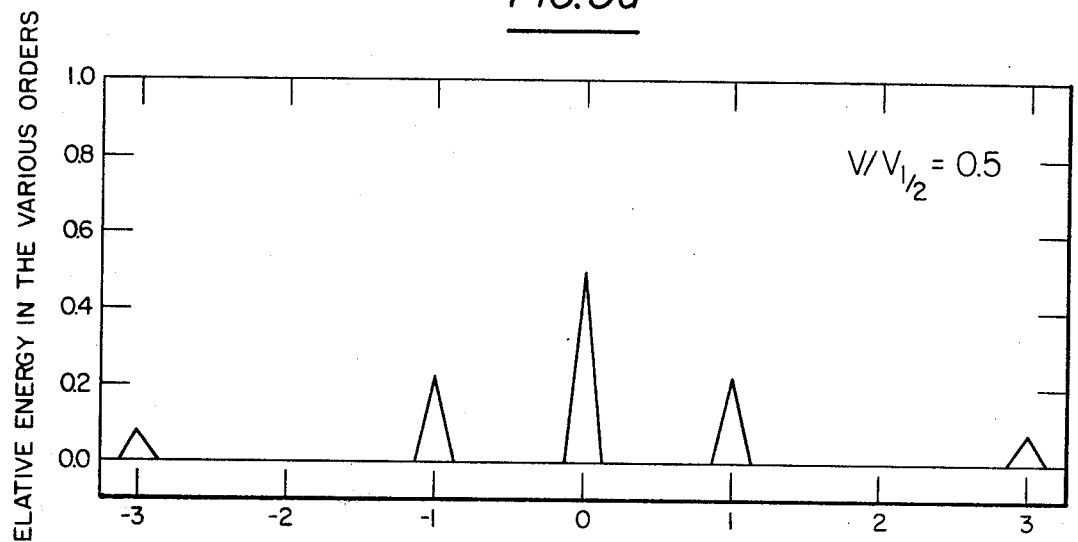
Figure 3C:
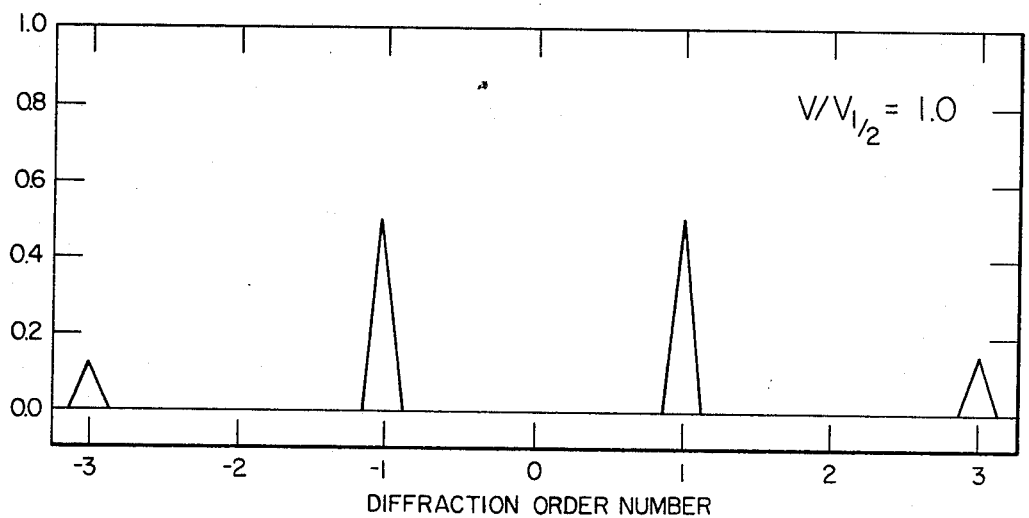

The representations of FIGS. 3A, 3B and 3C depict how the far-field pattern changes as a function of the applied voltage. The total amount of energy in each of the representations of FIGS. 3a, 3b and 3c is equal. The only difference between the representations is that the energy distribution is different among the various orders of diffraction. The order of interest is the zeroth order which is modulated by an applied electric field impressed across the interdigital electrodes. The modulating information can be pulse code, analog signals, etc. that are fed from a driving circuit 17, for example, like that shown in FIGS. 4a and 4b.

Figure 5:
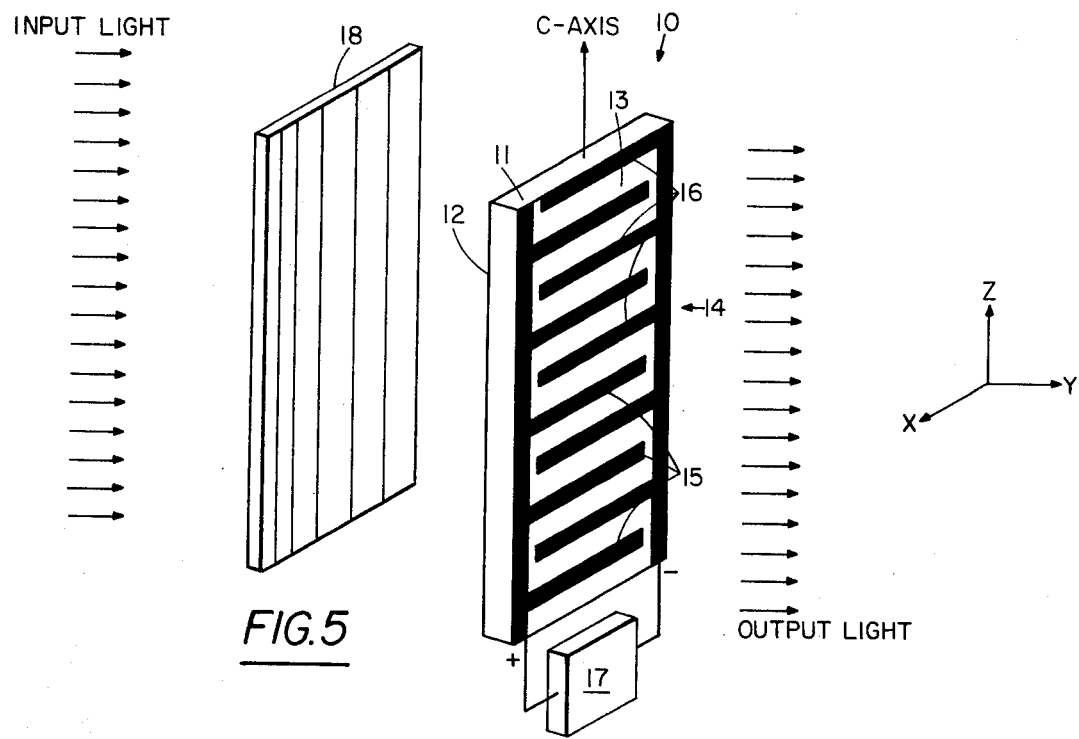
FIG. 5 shows a modification of the inventive concept.

Noting FIG. 5, an input polarizer 18 is positioned to place its transmission axis parallel to the optic axis or C-axis of the LiNbO$_3$ crystal slab. The energy distribution in the far-field pattern for the case of normal incidence is predicted by the equation:

$$I(r,s) = I_o \left[ \frac{\sin^2(\pi cr)}{(\pi cr)^2} \right] \left[ \frac{\sin^2(N\pi r)}{N^2 \sin^2(\pi r)} \right] \left[ \frac{\cos^2(\pi r + \pi s/2)}{\cos^2(\pi r)} \right]$$

where
 r=dO/λ
 s=V/V$_{\frac{1}{2}}$
 c=ε/d
 V$_{\frac{1}{2}}$=λ(d/L)2n$_e^3$r$_{33}$; (n$_e$=index of refraction for 0.633 μm light=2.200, r$_{33}$=electro-optic Pockel's coefficient=31.D X 10$^{-12}$$_{M/V}$) and
 I$_o$=light intensity for r and s equal to zero
 ε=slit width
 d=center-to-center spacing between electrodes
 N=number of slits in the array
 V$_{\frac{1}{2}}$=half-wave voltage (required to extinguish light energy in the zeroth order when operated in the tunable diffraction grating mode)
 L=effective crystal thickness
 λ=wavelength of light, e.g. 0.633 μm
 θ=half-angle measured from y-axis in the y-z plane Referring once again to FIGS. 3a, 3b and 3c, note the series of plots depicting how the far-field pattern changes as a function of the applied voltage V. The order of interest is the zeroth order, and the light intensity associated with this order is determined by setting θ equal to zero. Thus, the transmission of the modulator for the zeroth order is given by the relationship $$T = \cos^2(\pi V/2V_{\frac{1}{2}}).$$

The half wave voltage, V$_{\frac{1}{2}}$, for the tunable diffraction grating mode of operation was found to be about 900 volts, see FIG. 3d. In comparison, the half wave voltage when the crystal is driven in the conventional Pockel's mode with linear polarizers on the input and output side to assure a 90° phase shift between them, is much greater. Driving potentials to reach the half wave voltage for a crystal and electrodes configured as described above are in the neighborhood of 2950 volts when d is equal to L. This driving potential causes arcing between adjacent electrodes and comprises the effectiveness of the modulator when it is operated in the conventional Pockel's mode with 0.633 micrometer light. Another objectionable feature when this crystal was driven in the conventional Pockel's mode was that the acceptance angle was much too low. That is to say, incident light impinging on the crystal would not be diffracted acceptably unless it hit near normal (within an angle of plus and minus 10° to the normal).

However, when this same crystal was operated in the linear diffraction grating mode, the transmission characteristics were highly satisfactory. Noting FIG. 3d, the crystal could be operated so that its transmissivity or rather transmission of the zeroth order could be completely extinguished i.e., diffracted to higher orders at driving potentials of less than 1000 volts. At this potential level there was no arcing between adjacent electrodes. In addition, the angle of incidence encompassed an angle measuring in excess of plus and minus 45 degrees to the normal to the plane of the polished faces of the crystal.

As predicted by referring once again to the Raman-Nath effect, the angular spacing of the diffraction orders, Γθ, is equal to λ/ω where λ is the free space optical wavelength, in this case 0.633 μm light, and ω is the period of the phase grating which produces the modulation. (In this case ω equals twice the electrodes' spacing).

Referring once again to FIG. 1, the tunable diffraction grating modular is capable of receiving, modulating and transmitting collimated light. Optionally, as referred to above and shown in FIG. 5, a linear polarizer 18 having its axis parallel to the C-axis of the crystal can be employed to help assure better scattering of the incident light to the various orders. The potential required for nearly complete distribution of the energy from the zeroth order to the higher orders tend to be somewhat less than for collimated light alone.

Figure 4A:
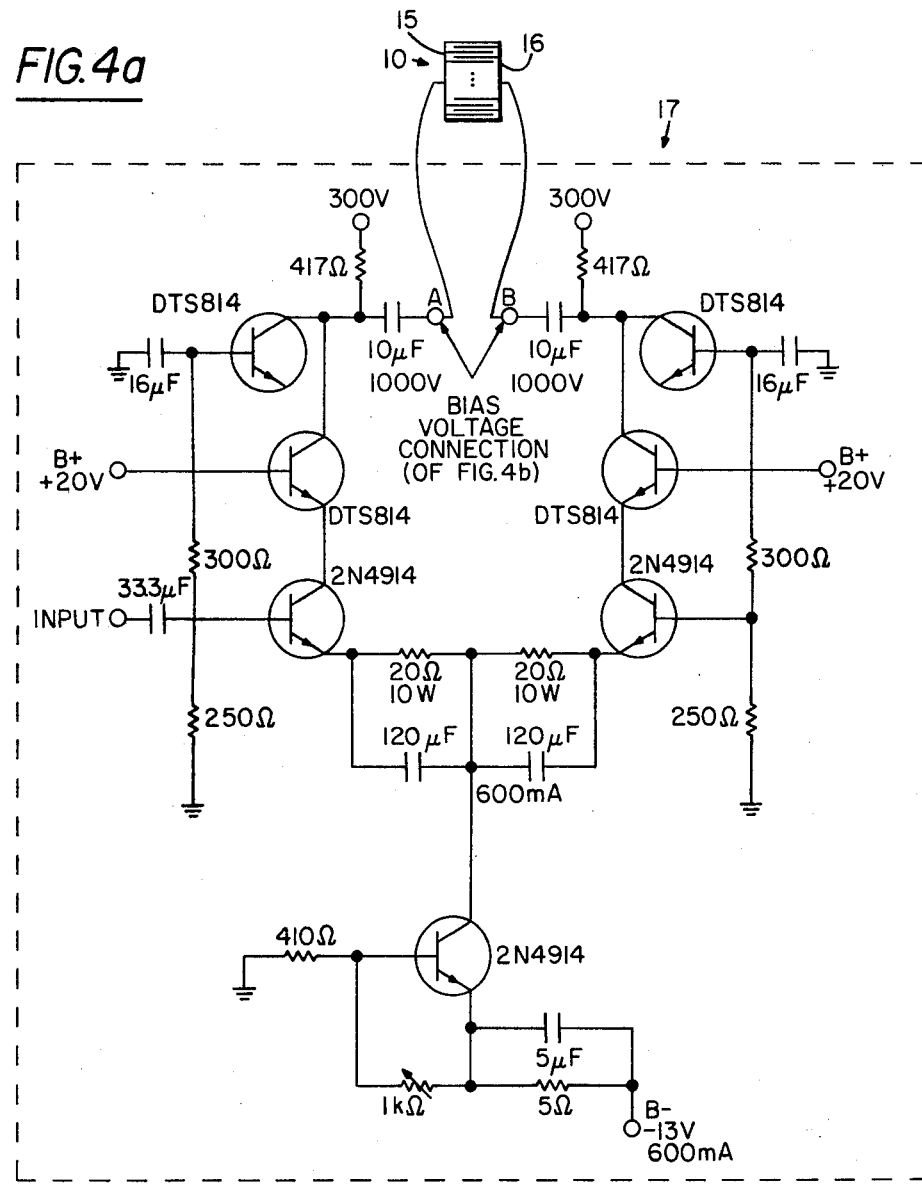
FIGS. 4a and 4b show a typical electronic driver modulator circuit.
Figure 4B:
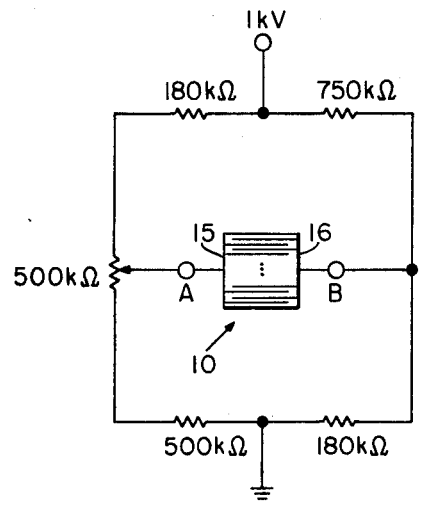

Before going to various modifications of the inventive concept, looks to FIGS. 4a and 4b wherein a typical electronic driver modulator circuitry 17 is shown. This electronic driver circuitry has a capability of electronically biasing the LiNbO$_3$ crystal from anywhere between 175 to 600 volts d.c. and swinging this bias up to plus and minus 300 volts for frequencies in the kilohertz range. In the schematic diagrams of FIGS. 4a and 4b, FIG. 4a showing the electronic driver circuit and FIG. 4b showing the electronic driver biasing circuitry, the crystal was driven within acceptable limits to modulate the zeroth diffraction order of 0.633 μm micrometer light. The modulating signal was varied from 14 to 24 kilohertz and the resultant voice quality was excellent.

Looking to FIG. 6, a modification of the invention employs a mirror 19. This has been found to improve the performance of the modulator since the single pass effect is doubled. Sets 15 and 16 of the interdigital electrodes modulate the incident light much the same as described above; however, when the mirror reflects the incident light back through the crystal, linear Pockel's effect is doubled to increase the diffraction of energy to higher orders.

Figure 7:
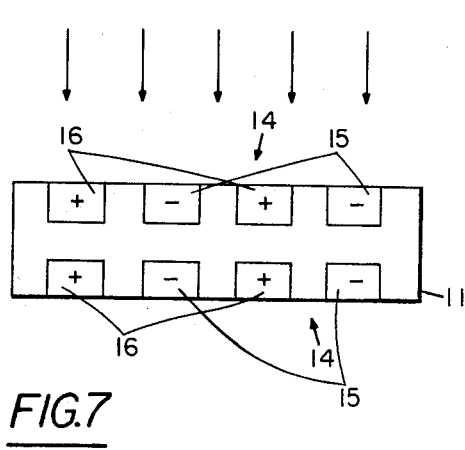
FIG. 7 discloses one scheme for assuring more uniform electric field distribution.

In FIG. 7, a modification of the concept calls for having interdigital electrodes 14 on both sides of the electro-optic slab 11. This helps assure more uniform electric field lines between the adjacent interdigital electrodes as a light beam makes its transitions through the electro-optic slab. It is to be noted that in the embodiment depicted in FIG. 7, both sets of the interdigital electrodes are shown recessed into the surface of the crystal. Optionally, the electrodes can be deposited on or in one or both of the crystal's polished faces depending on the design requirements.

Figure 8:
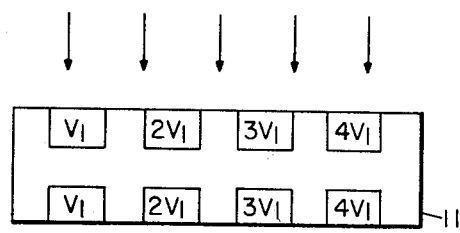
FIG. 8 shows a modification adaptable to all embodiments of the invention for assuring the high-speed beam steering.

Beam steering of a high power optical beam is readily accomplished by employing AC voltages having the relative magnitudes as indicated in FIG. 8. Here again, electro-optic slab 11 has its C-axis oriented perpendicularly to the direction of the incident light. The electrodes are orthogonally disposed as described with respect to the embodiments above and when AC potentials are applied, high speed beam steering of the incident light is readily accomplished.

Figure 9:
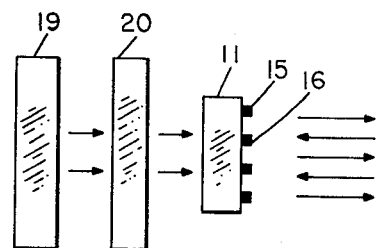
FIG. 9 is another adaptation for optimizing performance which includes the addition of a quarter wave plate and a mirror.

In FIG. 9 the device's efficiency of effectiveness can be further improved by using a quarter wave plate 20 in conjunction with a mirror 19 aligned with a crystal slab 11. A quarter wave plate, that being a plate such as a double refracting crystal or other material having a density such that a phase difference of one quarter of a cycle is formed between the ordinary and extraordinary elements of light passing through, is advantageously used with the reflective capabilities of mirror 19. This makes the modulator independent of the polarization of the incident beams. The initial pass of light through the slab 11 will modulate the two polarization components of the incident beam unequally. However, upon reflection from mirror 19, the reflected beam will be rotated by 90° through the quarter wave plate and the modulation will be equalized through the second pass (of the reflective beam) through the modulator material. Thus, it can be seen that the device is made to be independent of the polarization of the incident beam.

Figure 10:
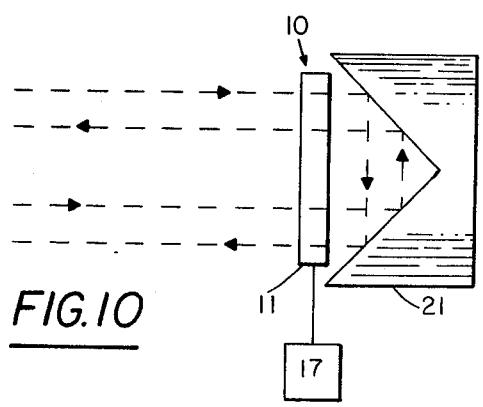
FIG. 10 shows a retroreflector used with the invention.

FIG. 10 displays perhaps one of the more unique features of the invention. Here, it functions as a passive modulator of incident energy. Incoming light passes through and is modulated by electro-optic slab 11 in response to signals coming from modulating potential source 17. The retroreflector 21 reflects the incident energy back through the slab and back to the source of light. Retroreflectors of this type are well known in the art and optionally could be of a coated solid corner cube, a hollow corner cube array or a coated hollow corner cube reflector all of which are commercially available from a variety of sources.

At the light source a suitable demodulator device can extract information in accordance with the signals impressed on the beam by the modulating source 17. This feature provides for the passive transmission of information back to a source of light. A remotely located interrogating search light, for example, could illuminate a number of passive retroreflectors which would return modulated light energy to the light source.

Obviously, many other modifications and variations of the present invention are possible in the light of the above teachings. It is therefore to be understood that within the scope of the appended claims the invention may be practiced otherwise than as specifically described.

What is claimed is:

1. A larger apertured apparatus for modulating impinging collimated optical signals in the tunable diffraction grating mode comprising:

an electro-optical crystal slab selected from the group of materials including acoustic grade lithium niobate and lithium tantalate having parallel, optically polished lateral faces dimensioned in at least of an order of magnitude greater than the crystal's thickness and fabricated from a material to orient the crystal's optic axis parallel to the lateral faces;

a first set of interdigital metallic electrodes orthogonally disposed with respect to the optic axis to extend across one of the lateral faces in an interdigital grating pattern, the dimensions of and the spacing between adjacent electrodes being such as to define a diffraction grating;

a second set of interdigital metallic electrodes disposed on the other one of the lateral surfaces in an interdigital grating pattern orthogonally disposed with respect to the crystal's optic axis and substantially identically spaced with respect to the first set of interdigital electrodes, the second set of interdigital metallic electrodes help provide a more uniform linear transverse Pockel's effect and like the first set of interdigital electrodes each electrode has a width less than the separation between adjacent electrodes to create predictable diffraction orders; and a source of potential coupled to both sets of the interdigital electrodes, the magnitude of the potential is maintained within a predetermined range to change the intensity of the zeroth diffraction order within preestablished limits and to prevent arcing between adjacent electrodes, to drive alternating electrodes in each set plus and minus producing changing electric fields in alternating directions substantially parallel to the optic axis to permit the selective change of index of refraction in the crystal, the changing electric fields in alternating directions create a linear transverse Pockel's effect for redistributing the diffraction orders of the impinging optical signals across a spatial period of a phase shift equal to twice the electrode spacing, the crystal and the electrodes are orientated to receive, modulate and transmit optical signals impinging from within an angle of incidence centered about the normal to the lateral faces; and an input linear polarizer disposed to receive the impinging optical signals having its transmission axis parallel to the crystal.

2. An apparatus according to claim 1 (amended) in which the source of potential is an a.c. source having like polarities coupled to laterally aligned electrodes of the first and second set of interdigital electrodes to allow high speed steering of high powered optical beams.

3. A larger apertured apparatus for modulating impinging collimated optical signals in the tunable diffraction grating mode comprising:

an electro-optical crystal slab selected from the group of materials including acoustic grade lithium niobate and lithium tantalate having parallel, optically polished lateral faces dimensioned in at least of an order of magnitude greater than the crystal's thickness and fabricated from a material to orient the crystal's optic axis parallel to the lateral faces;

a first set of interdigital metallic electrodes orthogonally disposed with respect to the optic axis to extend across one of the lateral faces in an interdigital grating pattern, the dimensions of and the spacing between adjacent electrodes being such as to define a diffraction grating;

a second set of interdigital metallic electrodes disposed on the other one of the lateral surfaces in an interdigital grating pattern orthogonally disposed with respect to the crystal's optic axis and substantially identically spaced with respect to the first set of interdigital electrodes, the second set of interdigital metallic electrodes help provide a more uniform linear transverse Pockel's effect and like the first set of interdigital electrodes each electrode has a width less than the separation between adjacent electrodes to create predictable diffraction orders; and a source of potential coupled to both sets of the interdigital electrodes, the magnitude of the potential is maintained within a predetermined range to change the intensity of the zeroth diffraction order within preestablished limits and to prevent arcing between adjacent electrodes, to drive alternating electrodes in each set plus and minus producing changing electric fields in alternating directions substantially parallel to the optic axis to permit the selective change of index of refraction in the crystal, the changing electric fields in alternating directions create a linear transverse Pockel's effect for redistributing the diffraction orders of the impinging optical signals across a spatial period of a phase shift equal to twice the electrode spacing, the crystal and the electrodes are orientated to receive, modulate and transmit optical signals impinging from within an angle of incidence centered about the normal to the lateral faces; and a flat mirror is disposed behind the electro-optical crystal to double its single pass effect on the impinging collimated optical signals and to return the signals toward their source.

4. An apparatus according to claim 3 in which the source of potential is an a.c. source having like polarities coupled to laterally aligned electrodes of the first and second set of interdigital electrodes to allow high speed steering of high powered optical beams.

5. An apparatus according to claim 4 further including:

an input linear polarizer disposed to receive the impinging optical signals having its transmission axis parallel to the crystal.

6. An apparatus according to claim 3 further including:

a quarter wave plate interposed between the electro-optical crystal and the flat mirror making the apparatus independent of the polarization of the impinging optical signals.

7. An apparatus according to claim 6 in which the source of potential is an a.c. source having like polarities coupled to laterally aligned electrodes of the first and second set of interdigital electrodes to allow high speed steering of high powered optical beams.

8. An apparatus according to claim 7 further including:

an input linear polarizer disposed to receive the impinging optical signals having its transmission axis parallel to the crystal.

* * * * *